Jan. 10, 1961 K. O. SISSON 2,967,546
SEPARATE WASH AND RINSE TEMPERATURE SELECTORS
Filed Sept. 26, 1956 6 Sheets-Sheet 1

INVENTOR.
Kenneth O. Sisson
BY Edwin S. Dybvig
HIS ATTORNEY

INVENTOR.
Kenneth O. Sisson
BY Edwin S. Dybvig
HIS ATTORNEY

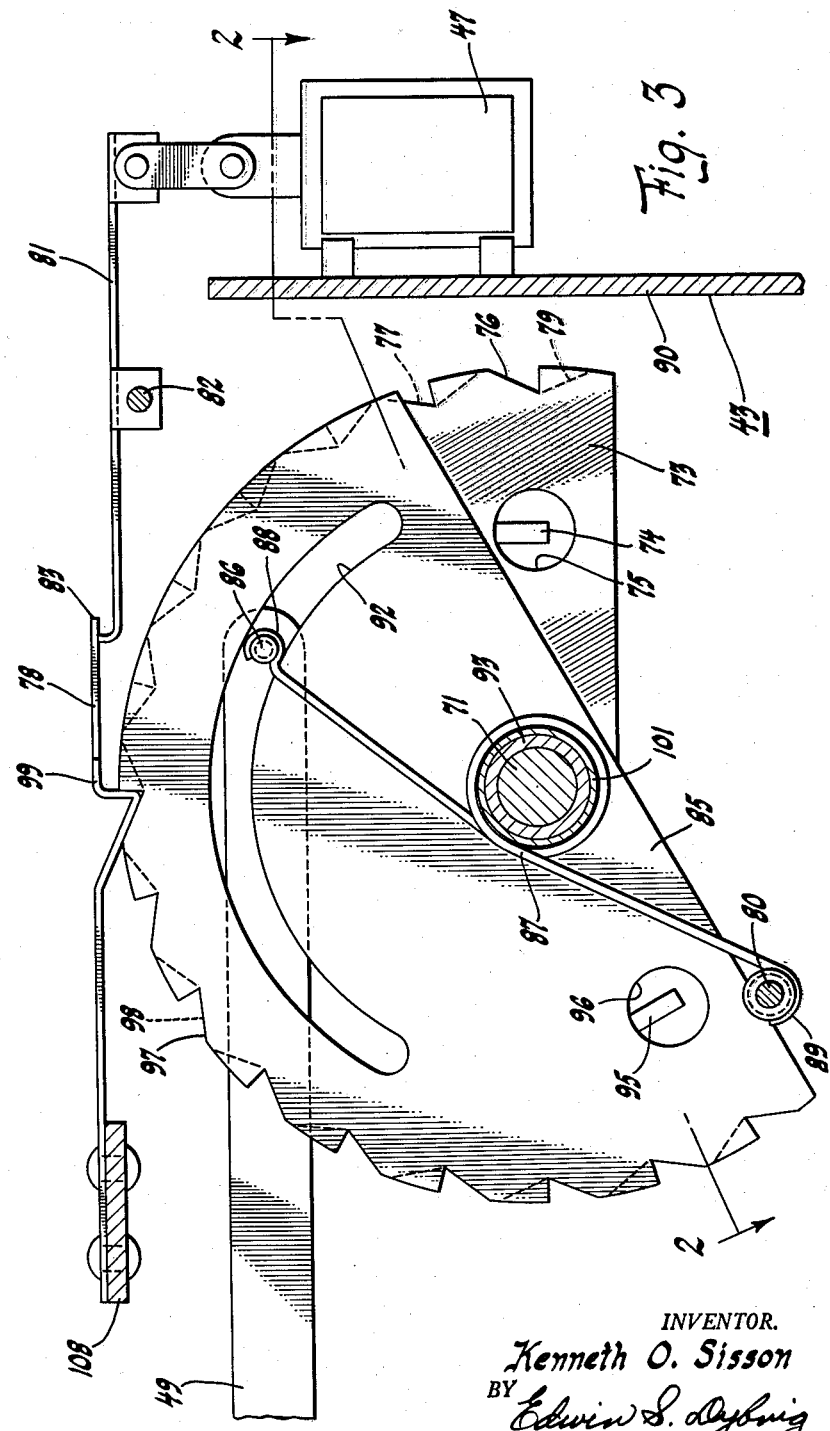

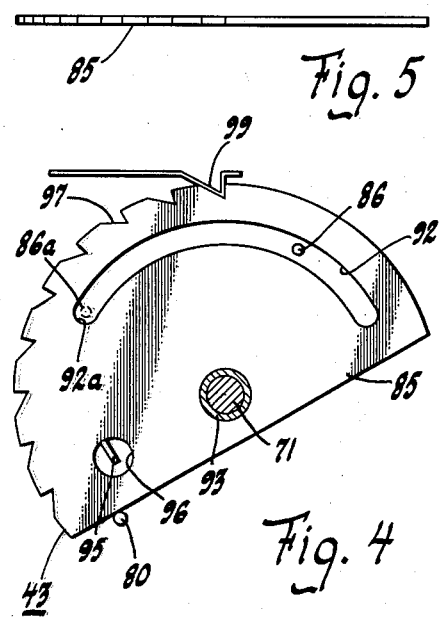
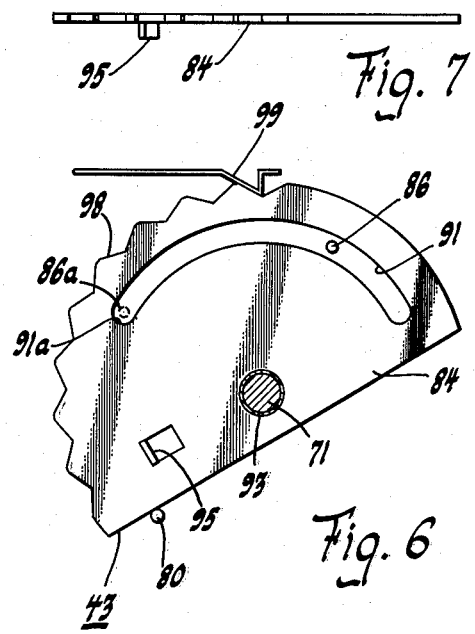
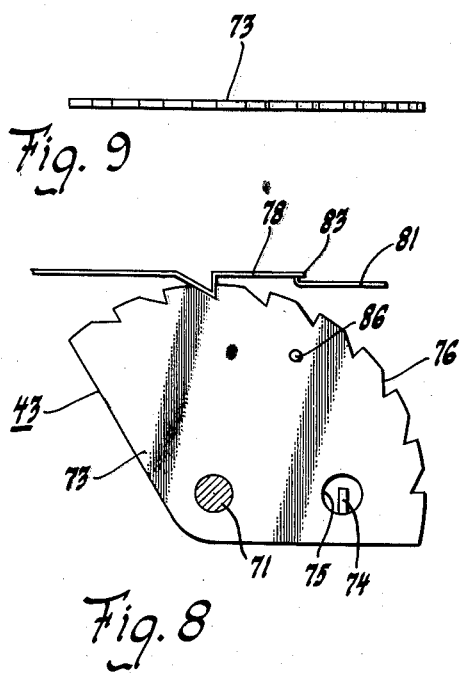
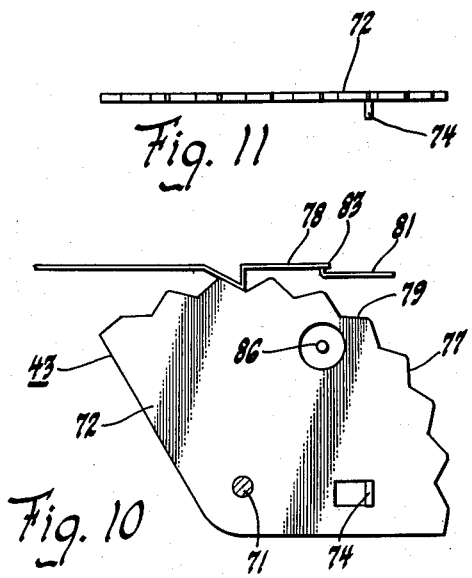

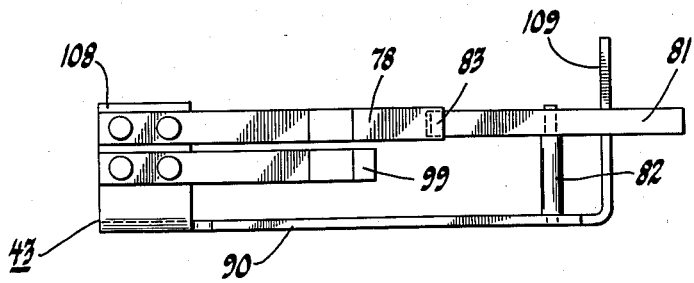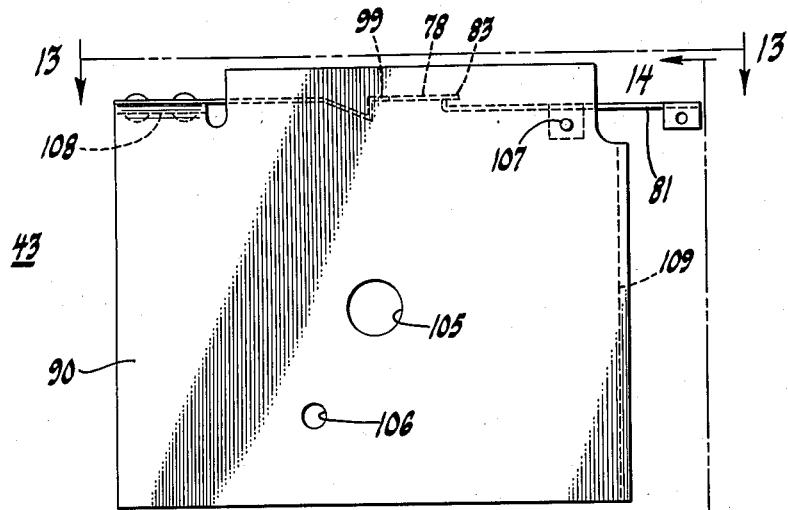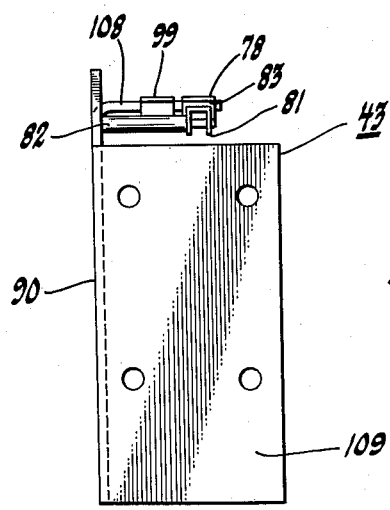

Jan. 10, 1961 K. O. SISSON 2,967,546
SEPARATE WASH AND RINSE TEMPERATURE SELECTORS
Filed Sept. 26, 1956 6 Sheets-Sheet 6
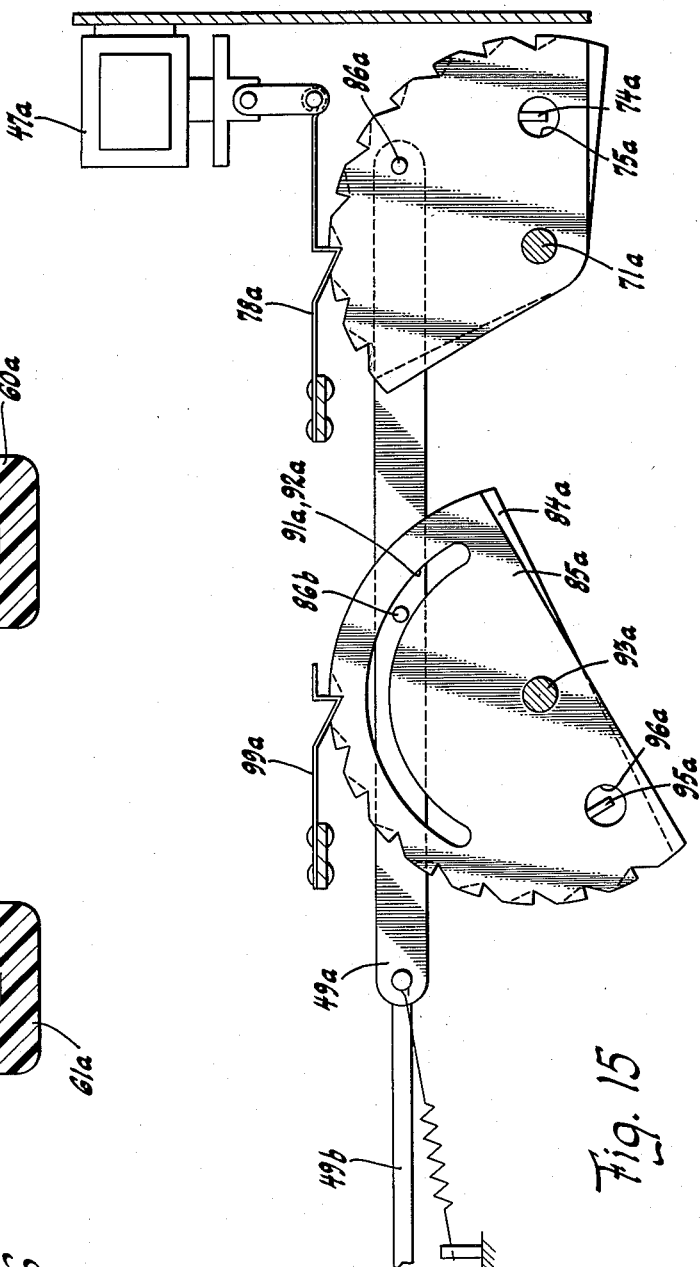
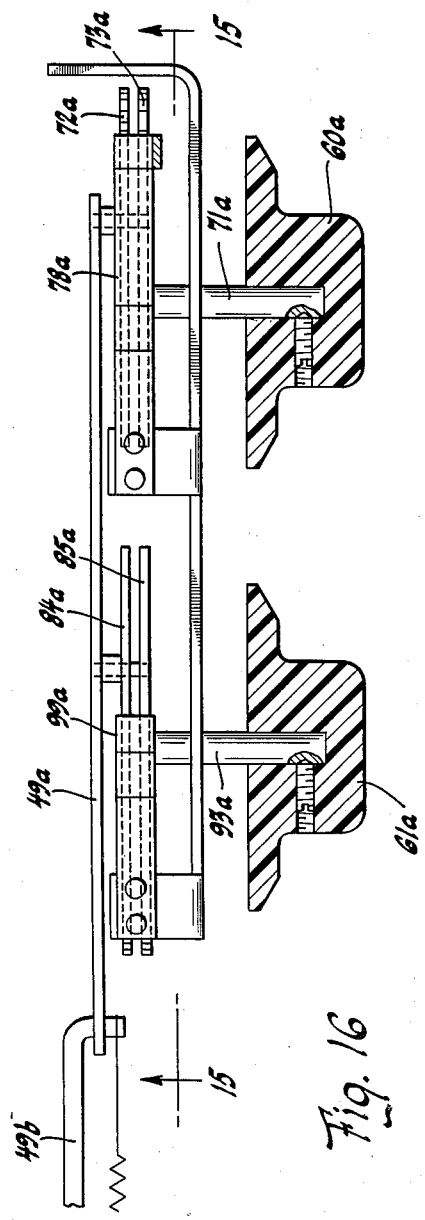
INVENTOR.
Kenneth O. Sisson
BY Edwin S. Dybvig
HIS ATTORNEY

United States Patent Office 2,967,546
Patented Jan. 10, 1961

2,967,546
SEPARATE WASH AND RINSE TEMPERATURE SELECTORS

Kenneth O. Sisson, Dayton, Ohio, assignor to General Motors Corporation, Detroit, Mich., a corporation of Delaware Filed Sept. 26, 1956, Ser. No. 612,262

7 Claims. (Cl. 137—624.2)

This invention relates to domestic appliances and more particularly to automatic clothes washing machines.

An object of this invention is to provide a washing machine with a wash fill and rinse fill temperature selector which may be preset by the user to vary the relative temperature of water delivered by the water valve construction during the wash fill in comparison to the temperature of the water during the rinse fill.

Another object of this invention is to provide a washing machine with selector means manually settable to control the relative setting of the valve adjusting means of the hot and cold valve construction which introduces a wash fill and a rinse into an automatic washing machine, said selector being controlled by the timer and varying the temperature of the wash fill in comparison to the temperature of said rinse fill.

Another object of this invention is to provide an automatic washing machine with a simple form of adjustable temperature water valve and with a wash and rinse temperature selector which may be combined with a timer to allow the user to vary and select the temperature difference between the wash and rinse waters.

Further objects and advantages of the present invention will be apparent from the following description, reference being had to the accompanying drawings wherein a preferred form of the invention is clearly shown.

In the drawings:

Figure 3 is a view taken along the line 3—3 of Figure 2.

Figure 4 is a side view along line 4—4 of Figure 2, showing mainly the rinse temperature latch plate, with only certain other parts shown to illustrate relative locations.

Figure 5 is a top view of Figure 4, showing the plate only.

Figure 6 is a side view along the line 6—6 of Figure 2, showing mainly the rinse temperature release plate, with only certain parts added.

Figure 7 is a top view of Figure 6 showing the plate only.

Figure 8 is a side view along the line 8—8 of Figure 2, showing mainly the wash fill latch plate, with certain parts added.

Figure 9 is a top view of Figure 8.

Figure 10 is a side view along the line 10—10 of Figure 2, showing mainly the wash fill release plate, with certain parts added.

Figure 11 is a top view of Figure 10, showing the plate only.

Figure 12 is a side view of the casing for the wash and rinse fill selector and showing the latching levers.

Figure 13 is a view taken along the line 13—13 of Figure 12.

Figure 14 is a view taken along the line 14—14 of Figure 12.

Figures 15 and 16 are side and top views, respectively, of another embodiment of the wash and rinse fill selector, Figure 15 being taken along the line 15—15 of Figure 16.

Figure 1:
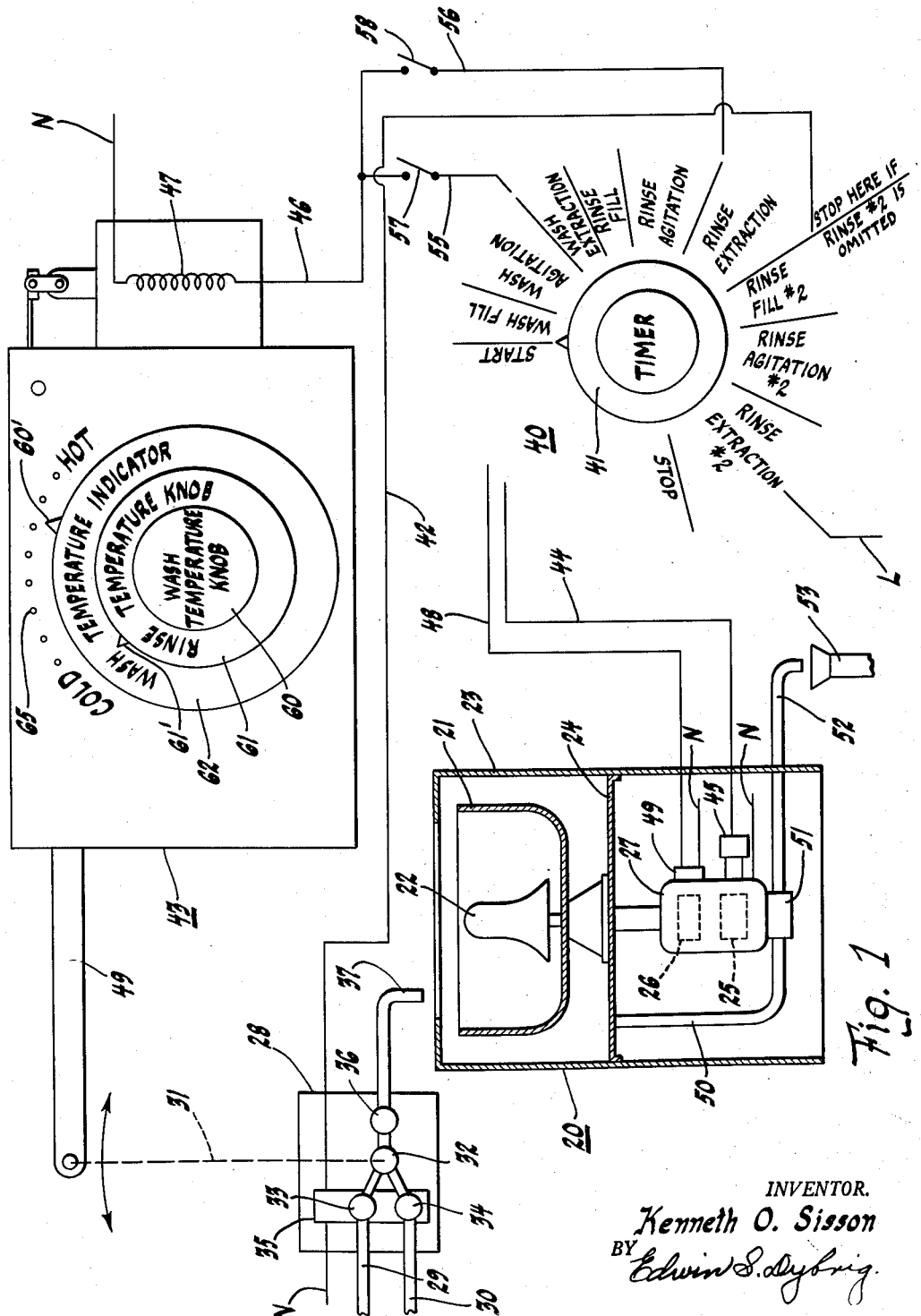
Figure 1 is a diagrammatic view showing the relationship of the various controls of the washing machine.

Referring particularly to Figure 1, an automatic clothes washing machine 20 is shown, using the vertical tub type merely for the purpose of illustration. Such machine may be, for example, of the type disclosed in the patent to Kendall Clark, No. 2,577,647, patented December 4, 1951. It includes a tub or container 21, agitator 22, casing 23, bulkhead 24, motor 25, spin and agitation transmission 26, and power casing 27. A water valve construction 28 is adapted to be connected to hot and cold water supply lines or pipes 29 and 30 respectively. Such valve construction may include delivery temperature adjusting means or lever 31 which adjusts the proportioning on mixing or thermostatic valve 32 to cause delivery of water of selected temperature. Hot and cold water valves 33 and 34, respectively, are controlled and opened simultaneously by the solenoid 35. A constant volume, or pressure reducing valve 36 provides for a constant volume of water delivery at the nozzle 37 per unit of time.

The mixing valve 32 may be a simple non-thermostatic valve which varies the ratio of the hot and cold water being admitted to and received by the tub. Such valves are of cheaper construction. The user can regulate the selector to be described to provide the desired wash and rinse temperatures in a very efficient and economical manner.

A timer 40, of well known construction, such as disclosed in my Patent No. 2,549,025, patented April 17, 1951, has a setting knob 41, which may be pushed in to start the timer motor, not shown, and the washing machine 20. Timer contacts, not shown, energize the electric line 42 and solenoid 35 for a selected period of time to deliver the desired quantity of water in tub 21, which mixes with detergent placed in the tub with the clothes to be washed to provide a detergent containing wash fill. The temperature of this fill is determined by the position of temperature adjusting lever 31, which is controlled by the manually settable wash and rinse fill temperature selector 43 in a manner more fully to be described.

After the timer knob 41 progresses to the wash agitation period, which period may be adjustable, as described in my said patent, timer contacts not shown, energize the electric line 44, motor starter-protector 45 and motor 25. The transmission 26 causes the tub 21 to remain stationary and the agitator 22 to produce agitation either by vertical or rotational reciprocation, or both.

Some time after the wash fill, such as when the timer knob 41 reaches the beginning of the wash extraction period, the timer energizes the line 46 leading to the solenoid 47 of the selector 43 and also energizes the line 48 leading to the spin solenoid 49 to shift the transmission to cause spin of tub 21 and stop agitation of agitator 22. The motor 25 is also energized at this time. Energization of selector solenoid 47 causes selector 43 to shift link 49 and lever 31 to the left, for example, as more fully hereafter explained, in readiness to provide a cooler rinse fill when the timer later reaches the rinse fill position. The spinning of tub 21 empties the wash water over the rim of the tub and extracts a substantial portion of the water entrained in the clothes in the tub. The water flows to the sump formed by bulkhead 24, thence through pipe 50 to pump 51 from which it is discharged through nose 52 to drain or laundry tub 53.

When timer knob 41 enters the rinse fill period, line 42 is energized to actuate solenoid 35 and open valves 33 and 34. The temperature valve or thermostat 32 then feeds cooler rinse water into tub 21, if the selector 43 had been preset for a cooler rinse water. However, if the selector 43 had not been so preset, then the rinse water would have the same temperature as the wash water, as more fully hereafter explained.

Thereafter, the timer 40 causes "rinse agitation" and "rinse extraction" by energizations similar to those previously described in connection with the wash agitation and wash extraction previously described.

In some automatic washing machines, only one rinse operation is provided, in which case the timer is constructed to stop and deenergize all connections at the end of the first rinse extraction, as indicated in Figure 1. Other washing machines provide one or more additional rinse operations in which case the timer is constructed to repeat proper energizations to produce rinse fill, agitation and extraction for a second time (or more) as indicated by "rinse agitation #2" etc. in Figure 1. When there is a second rinse, it may be desirable to have a second set of fill and extraction contacts and to provide separate lines 55 and 56 and a switch 57 in series with solenoid 47 so the user may cause the change to cooler water to take place either for the first and second rinses (by closing switch 57) or only for the second rinse (by opening switch 57) as will become apparent upon further description of the selector 43.

The timer is constructed to stop all operations at the end of the last extraction. If desired, a switch 58 may be provided so the user may prevent actuation of selector 43, by opening both switches 57 and 58, in which case the selector remains as set.

Figure 2:
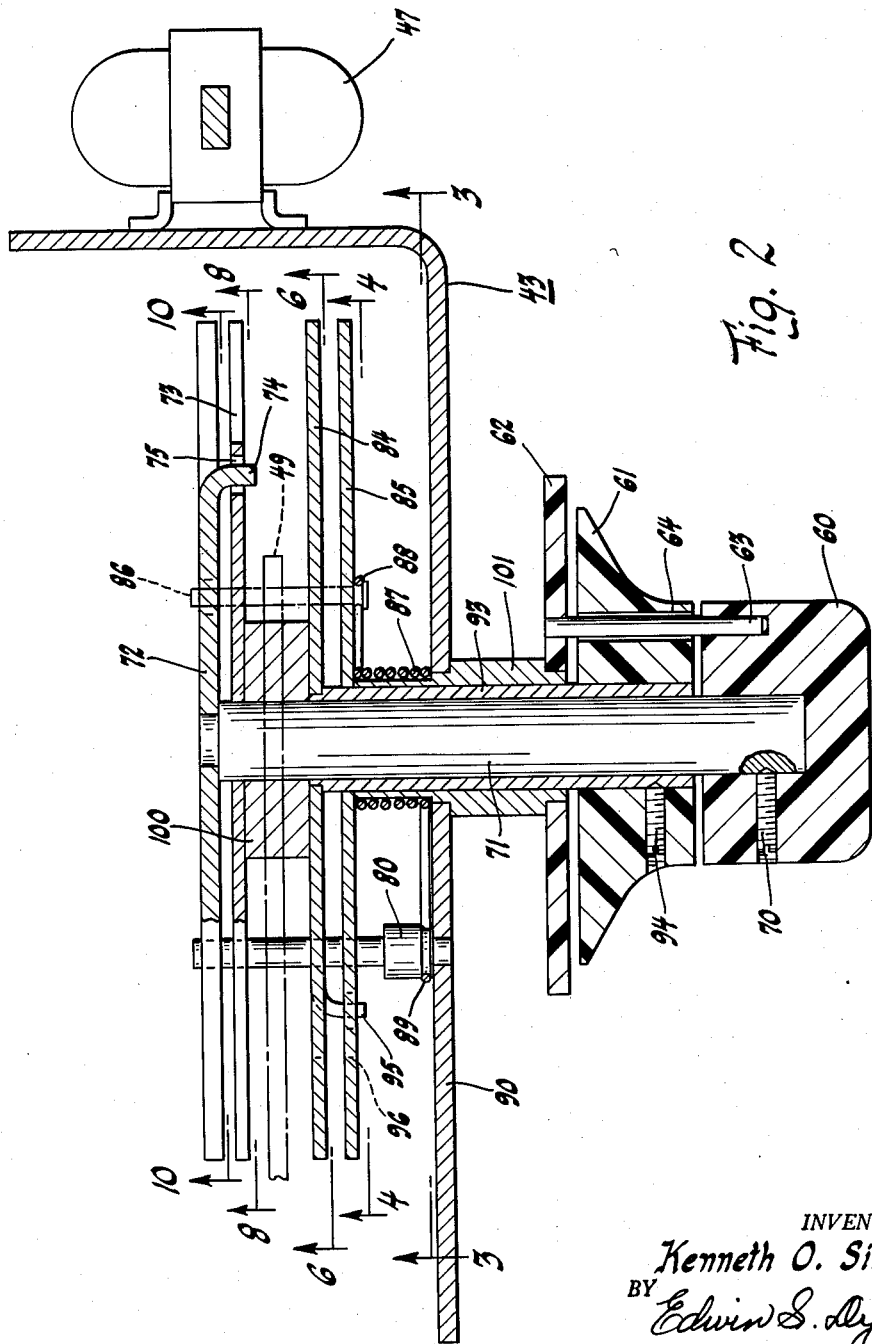
Figure 2 is a view taken along the line 2—2 of Figure 3 showing the wash and rinse fill temperature selector.

The construction of selector 43 is further disclosed in Figures 2 to 15 for one embodiment and Figures 16 and 17 for another embodiment. Referring first to Figures 1 to 15, the selector has a "wash temperature knob" 60 and a "rinse temperature knob" 61 (Figures 1 and 2). Knob 60 is drivingly connected to "wash temperature indicator" 62 by a pin 63 passing freely through arc-shaped slot 64 in knob 61. Knob 60 therefore actuates pointer 60' and knob 61 actuates pointer 61'. The user may preset these pointers at the same place on dial 65, or may preset them to provide a cooler rinse temperature than the wash temperature, as shown in Figure 1. If the washing machine has two rinses, and switch 57 is closed and the selector 43 is preset, as shown in Figure 1, the wash temperature will be between "hot" and "cold," i.e., tepid, and the two rinses will be "cold." If switch 57 is opened and switch 58 is closed, then the wash temperature and first rinse temperature will be between "hot" and "cold" i.e., tepid, and the second rinse will be "cold." If both switches 57 and 58 are opened, the wash and both rinses will be between "hot" and "cold," as the selector 43 has been rendered ineffective to change the setting of the valve or thermostat 32, as will become more fully apparent.

The setting of wash temperature knob 60 to the position 60' moves and holds the link 49 and lever 31 in the position shown in Figure 1. This will become apparent with particular reference to Figures 2 to 4, 9 to 14. The knob 60 is keyed at 70 to shaft 71 which is fixedly secured to wash temperature release plate or segment 72. The plate 72 is rotationally connected by lost motion to wash temperature latch plate 73. The lost motion includes tongue 74 on plate 72 and larger opening 75 on plate 73. Turning knob 60 clockwise directly turns plate 72 and indirectly turns plate 73 by lost motion 74 and 75. Plate 73 is loose on shaft 71. During clockwise turning of knob 60, the latch notches 76 on plate 73 are aligned with the left halves 77 of the notches in release plate 72. This permits the downwardly biased spring latch 78 to enter into one latch notch 76 (Figure 8) and one left half 77 of the notches in plate 72 (Figure 10). However, if the user wishes to release such setting, the knob 60 and release plate 72 are turned counter-clockwise, causing the right half 79 to push up on latch 78 and release the plates 72 and 73 for counter-clockwise movement, as far as desired by the user and within the limit of stop pin 80.

The latch 78 is lifted also by the action of solenoid 47 pulling on lever 81 to turn it about fulcrum 82 to lift the end 83 of latch 78 and allow plates 72 and 73 for counter-clockwise movement, as far as desired by the user and within the limit of stop pin 80.

The latch 78 is lifted also by the action of solenoid 47 pulling on lever 81 to turn it about fulcrum 82 to lift the end 83 of latch 78 and allow plates 72 and 73 to turn counter-clockwise to a position in alignment with the setting of the rinse plates 84 and 85, in a manner to be described. The plate 73 is connected by a pin 86 with the link 49 which adjusts the water valve 32. Hence, the position of plate 73 determines the temperature of the water fed to the tub 21. During the wash fill, the plate 73 is in the position shown in Figure 8 with the link 49 and lever 31 in the position of Figure 1. When the plate 73 is released by solenoid 47 (during "wash extraction" for example) it turns counter-clockwise to the "cold" position of plates 84 and 85. This turning movement is caused by the spring 87 which has a counter-clockwise bias and has its ends 88 and 89 in engagement with the pins 86 and 80 respectively. Pin 80 is a stop pin stationarily carried by casing 90 and pin 86 being secured to plate 73.

The rinse temperature release plate 84 and rinse temperature latch plate 85 (Figures 4 to 7) determine the temperature of the rinse water by allowing the pin 86 to move in the slots 91 and 92 from the full line position (tepid wash fill) to the dotted line position 86a which moves link 49 (attached to pin 86) to the cold position at the ends 91a and 92a of slots 91 and 92.

The release plate 84 is fixed to sleeve 93 which in turn is keyed at 94 to rinse knob 61. Latch plate 85 is loosely mounted on sleeve 93 and has a lost motion connection with plate 84 through the medium of tongue 95 on plate 84 and larger opening 96 on plate 85. Latch notches 97 on plate 85 and release notches 98 on plate 84 have a similar coaction with downwardly biased latch spring 99 which was previously described with regard to notches 76 and 77, 79. As long as knob 61 is turned clockwise, notches 97 and 98 cooperate to allow latch spring 99 to lock plates 84 and 85 against counter-clockwise movement. However, if knob 61 is turned counter-clockwise, the latch 99 is lifted up to allow the plates 84 and 85 to be turned counter-clockwise. This releasing action stops when movement of knob 61 is stopped by the user.

A spacer 100 is placed between plates 73 and 84. A stationary sleeve 101 is secured to the casing 90, which is a bearing for sleeve 93 and indicator disk 62. Sleeve 101 also serves as an axial spacer between casing 90 and plate 85 around which the spring 87 is assembled.

A sheet metal casing 90 is provided for the selector 43. The sleeve 101 is secured in opening 105. Pin 89 is secured in opening 106. Fulcrum pin 82 is secured in opening 107. Latches 78 and 99 are secured to the bent portion 108. Solenoid 47 is secured to the bent portion 109.

In the embodiment of Figures 15 and 16, the general arrangement of washing machine 20, timer 40, and water mixing valve construction 28 may be the same as shown and described with respect to Figure 1. The coaxial knob arrangement of selector 43 of the previously described embodiment is changed to the parallel knob arrangement shown in Figures 15 and 16. In this embodiment, the parts which correspond substantially to similar parts in Figures 1 to 15 have been numbered with the same number followed by the letter "a." For example, the wash temperature latch plate 73 of Figures 1 to 15 has its counterpart 73a in Figures 15 and 16. All the other corresponding parts have been similarly numbered, and it is deemed unnecessary to describe them in detail, as their similarity in structure and function is obvious from the previous description of Figures 1 to 15. The main difference is that the knobs 60a and 61a are side by side and have parallel shafts 71a and 93a, instead of coaxial shaft 71 and sleeve 93 of Figures 1 to 15. Likewise, the wash temperature plates 72a and 73a are side by side with rinse temperature plates 84a and 85a instead of coaxially arranged as in Figures 1 to 15. The solenoid 47a pulls its armature up instead of down. A second link 49b has been indicated to permit link 49a to travel freely. Two pins 86a and 86b secured respectively to the wash plate 73a and rinse plate 85a, are provided instead of the single pin 86.

In the operation of the embodiment of Figures 1 to 14, the user sets the wash knob 60 and its indicator 60' at a selected wash fill temperature, and sets the rinse knob 61 at a lower temperature, for example. The timer knob 41 is set at "start" and is pushed in. The selector 43 causes valve 32 to supply water for the detergent wash at a relatively hot temperature. After the wash fill, and before the rinse fill, the timer 40 energizes the solenoid 47 and causes the selector 43 to push the link 49 leftward and set the valve 32 at a colder temperature, for a colder rinse fill. If the switch 57 is open, and the washing machine has two rinses, the cooler fill will not occur until the second rinse. If both switches 57 and 58 are opened, the selector is prevented from changing the valve 32 and all the fills, both wash and rinse, will be at the higher temperature setting. If only one rinse is provided in the washing machine, the switch 57 may be omitted, and the rinse indicator 61' may be set in alignment with wash indicator 60', when it is desired to provide wash and rinse fills of the same temperature.

In the embodiment of Figures 15 and 16, the selector shown is connected to the timer and washing machine identically as in Figure 1. The only difference is that the wash knob 60a and rinse knob 61a are on parallel shafts instead of on the coaxial shaft and sleeve construction of Figures 2 to 14. The resulting operation is otherwise the same.

While the form of embodiment of the invention as herein disclosed constitutes a preferred form, it is to be understood that other forms might be adopted as may come within the scope of the claims which follow.

What is claimed is as follows:

1. A liquid temperature control system including higher and lower temperature liquid supply means, a common liquid receiving means, an adjustable proportioning means for proportioning the flow of higher and lower temperature liquid from said supply means to said receiving means, said proportioning means including adjustment means for adjusting the proportions of the higher and lower temperature liquid to said receiving means, a sequential control device having means for controlling said supply means to provide first and second separate delivery periods, a first delivery period temperature selector means operably connected to said adjustment means during said first period having a range of adjustment to provide an infinite number of different proportions of higher and lower temperature liquid, a second delivery period temperature selector means separate and independent of the first selector means operably connected to said adjustment means during said second period having a range of adjustment to provide at least two different proportions of higher and lower temperature liquid, said sequential control device having means for rendering effective said first selector means and for rendering ineffective said second selector means during said first delivery period and having means for rendering ineffective said first selector means and rendering effective said second selector means during said second delivery period.

2. A liquid temperature control system including higher and lower temperature liquid supply means, a common liquid receiving means, an adjustable proportioning means for proportioning the flow of higher and lower temperature liquid from said supply means to said receiving means, said proportioning means including adjustment means for adjusting the proportions of the higher and lower temperature liquid to said receiving means, a sequential control device having means for controlling said supply means to provide first and second separate delivery periods, a first delivery period temperature selector means having a range of adjustment to provide at least three different proportions of higher and lower temperature liquid, a second delivery period temperature selector means separate and independent of the first selector means having a range of adjustment to provide an infinite number of different proportions of higher and lower temperature liquid, connecting means between said adjustment means and said selector means including a connection with said first selector means and a lost motion connection with said second selector means, means for biasing said connecting means to adjust said adjustment means, latch means for holding said first selector means in at least three selective positions, said sequential device having means effective between said first and second periods for releasing said latch means to change the control of the adjustment means from the first to the second selector means.

3. A liquid temperature control system including higher and lower temperature liquid supply means, a common liquid receiving means, an adjustable proportioning means for proportioning the flow of higher and lower temperature liquid from said supply means to said receiving means, said proportioning means including adjustment means for adjusting the proportions of the higher and lower temperature liquid to said receiving means, a sequential control device having means for controlling said supply means to provide first and second separate delivery periods, a first delivery period temperature selector means having a range of adjustment to provide an infinite number of different proportions of higher and lower temperature liquid, a second delivery period temperature selector means separate and independent of the first selector means having a range of adjustment to provide an infinite number of different proportions of higher and lower temperature liquid, connecting means between said adjustment means and said selector means including a connection with said first selector means and a lost motion connection with said second selector means, means for biasing said connection means to adjust said adjustment means, latch means for holding said first selector means in at least three selective positions, said sequential device having means effective between said first and second periods for releasing said latch means to change the control of the adjustment means from the first to the second selector means, and means operable coincidentally to the movement of said first selector means from one position to another for releasing said latch means.

4. A liquid temperature control system including higher and lower temperature liquid supply means, a common liquid receiving means, an adjustable proportioning means for proportioning the flow of higher and lower temperature liquid from said supply means to said receiving means, said proportioning means including adjustment means for adjusting the proportions of the higher and lower temperature liquid to said receiving means, a sequential control device having means for controlling said supply means to provide first and second separate delivery periods, a first delivery period temperature selector means including a first adjustment member and a first manipulating means for moving said adjustment member to various positions, a first releasable holding means for holding said first adjustment member in various positions, means for moving said adjustment means to positions corresponding to the position of said adjustment member, a second delivery period temperature selector means including a second adjustment member and second manipulating means for setting and holding said second adjustment member to desired positions, said sequential device having means effective between said first and second periods for releasing said first holding means, and means effective upon release of said first holding means for positioning said adjustment means in proportion to the position of said second adjustment member.

5. A liquid temperature control system including higher and lower temperature liquid supply means, a common liquid receiving means, an adjustable proportioning means for proportioning the flow of higher and lower temperature liquid from said supply means to said receiving means, said proportioning means including adjustment means for adjusting the proportions of the higher and lower temperature liquid to said receiving means, a sequential control device having means for controlling said supply means to provide first and second separate delivery periods, a first delivery period temperature selector means including a first rotatable adjustment member and first manipulating means for rotating said first adjustment member to desired angular positions, a first releasable holding means for holding said first adjustment member in said desired angular positions, a second delivery period temperature selector means including a second adjustment member and second manipulating means for moving said second adjustment member to desired positions, operable connecting means for moving said adjustment means to positions corresponding to angular positions of said first adjustment member, a lost motion connection connecting said connecting means and said second adjustment member, a second releasable holding means for holding said second adjustment member, biasing means for biasing said connecting means for movement of said adjustment means, said sequential device having means effective between said first and second periods for releasing said first holding means to render effective said biasing means to change the control from the first to the second selector means.

6. A liquid temperature control system including higher and lower temperature liquid supply means, a common liquid receiving means, an adjustable proportioning means for proportioning the flow of higher and lower temperature liquid from said supply means to said receiving means, said proportioning means including adjustment means for adjusting the proportions of the higher and lower temperature liquid to said receiving means, a sequential control device having means for controlling said supply means to provide first and second separate delivery periods, a first delivery period temperature selector means including a first adjustment member and a first manipulating means for moving said adjustment member to various positions, a first releasable holding means for holding said first adjustment member in various positions, means for moving said adjustment means to positions corresponding to the position of said adjustment member, a second delivery period temperature selector means including an adjustable plate provided with an elongated slot extending generally in the direction of adjustment, said sequential device having means effective between said first and second periods for releasing said first holding means, and positioning means connecting with said slot for positioning said adjustment means in accordance to the position of said slot upon the release of said first holding means.

7. A liquid temperature control system including higher and lower temperature liquid supply means, a common liquid receiving means, an adjustable proportioning means for proportioning the flow of higher and lower temperature liquid from said supply means to said receiving means, said proportioning means including adjustment means for adjusting the proportions of the higher and lower temperature liquid to said receiving means, a sequential control device having means for controlling said supply means to provide first and second separate delivery periods, a first delivery period temperature selector means including a first adjustable plate provided with teeth extending generally in the direction of adjustment, a first releasable latch means cooperating with the teeth of said plate for holding said plate in various desired positions, means for moving said adjustment means to positions corresponding to the position of said adjustable plate, a second delivery period temperature selector means including a second adjustable plate provided with a slot extending generally in the direction of adjustment of said second plate, said sequential device having means effective between said first and second periods for releasing said latch means, and positioning means engaging said slot and connecting with said first plate for positioning said adjustment means in accordance with the adjustment of said second plate upon release of said latch means.

References Cited in the file of this patent

UNITED STATES PATENTS

| | | |
|---|---|---|
| 2,296,266 | Breckenridge | Sept. 22, 1942 |
| 2,374,590 | Dunham | Apr. 24, 1945 |
| 2,442,886 | Bowen | June 8, 1948 |
| 2,548,651 | Chace et al | Apr. 10, 1951 |
| 2,598,918 | Jacobs et al. | June 3, 1952 |
| 2,607,207 | Branson | Aug. 19, 1952 |
| 2,619,284 | Maddock-Clegg et al. | Nov. 25, 1952 |
| 2,752,769 | Clark | July 3, 1956 |
| 2,841,003 | Conlee | July 1, 1958 |
| 2,858,687 | Clark | Nov. 4, 1958 |